United States Patent [19]

Dutt et al.

[11] Patent Number: 4,552,328
[45] Date of Patent: Nov. 12, 1985

[54] MOLD FOR MAKING TAMPER-PROOF CLOSURE

[75] Inventors: Herbert V. Dutt; Paul A. Santostasi, both of Sarasota, Fla.

[73] Assignee: Sun Coast Plastics, Inc., Sarasota, Fla.

[21] Appl. No.: 707,364

[22] Filed: Mar. 1, 1985

Related U.S. Application Data

[60] Division of Ser. No. 567,077, Jan. 5, 1984, Pat. No. 4,526,282, and a continuation of Ser. No. 491,673, May 5, 1983, abandoned.

[51] Int. Cl.$^4$ .......................... B29C 1/00; B29C 7/00; B29D 1/00; B29F 1/14
[52] U.S. Cl. ........................... 249/67; 249/59; 425/577; 425/438; 425/441
[58] Field of Search .................. 249/59, 67, 68; 425/438, 441, 443, 577

[56] References Cited

U.S. PATENT DOCUMENTS

| | | |
|---|---|---|
| 2,162,711 | 6/1939 | Hamberger . |
| 2,162,712 | 6/1939 | Hamberger . |
| 2,799,049 | 7/1957 | Wilson ............... 249/68 X |
| 3,142,402 | 7/1964 | Fox . |
| 3,208,649 | 9/1965 | Fields ............... 249/59 X |
| 3,325,576 | 6/1967 | Kessler . |
| 3,329,295 | 7/1967 | Fields . |
| 3,441,161 | 4/1969 | Van Baarn . |
| 3,555,606 | 1/1971 | Hedgewick ............ 425/441 X |
| 3,584,111 | 6/1971 | Allison ............... 425/438 X |
| 3,673,761 | 7/1972 | Leitz . |
| 3,720,343 | 3/1973 | Irish, Jr. . |
| 3,737,277 | 6/1973 | Uhlig ................. 425/438 |
| 3,784,041 | 1/1974 | Birch . |
| 3,904,165 | 9/1975 | Den Boer ............. 249/67 |
| 3,929,246 | 12/1975 | Leitz . |
| 3,940,103 | 2/1976 | Hilaire .............. 249/59 X |
| 4,019,711 | 4/1977 | Altenhof et al. ...... 249/68 X |
| 4,033,472 | 7/1977 | Aichinger . |
| 4,075,820 | 2/1978 | Standley . |
| 4,125,246 | 11/1978 | Von Holdt ........... 425/438 X |
| 4,143,785 | 3/1979 | Ferrell . |
| 4,155,698 | 5/1979 | Aichinger ........... 249/59 X |
| 4,231,486 | 11/1980 | Bock . |
| 4,308,965 | 1/1982 | Dutt . |
| 4,343,754 | 8/1982 | Wilde et al. . |
| 4,346,811 | 8/1982 | Hilane . |
| 4,352,436 | 10/1982 | Chartier et al. . |
| 4,496,302 | 1/1985 | Brown ............... 425/438 X |

FOREIGN PATENT DOCUMENTS

| | | | |
|---|---|---|---|
| 240079 | 8/1962 | Australia ........... | 249/59 |
| 1270357 | 7/1961 | France ............. | 249/59 |
| 1446505 | 8/1976 | United Kingdom . | |

Primary Examiner—J. Howard Flint, Jr.
Attorney, Agent, or Firm—Jones, Tullar & Cooper

[57] ABSTRACT

A tamper proof closure cap for a container, a tool for manufacturing the cap and a method for removing the cap from the tool are defined. The cap is designed with the tamper proof skirt as a unitary structure with the main body of the cap. The skirt has unique structural aspects which allow for less complexity in the tool and ease of removal of the cap from the tool. The tool includes a stripper ring which laterally support the skirt and permits a shift of the pivot plane for the skirt relative to the main body portion during removal of the cap from the mold.

5 Claims, 7 Drawing Figures

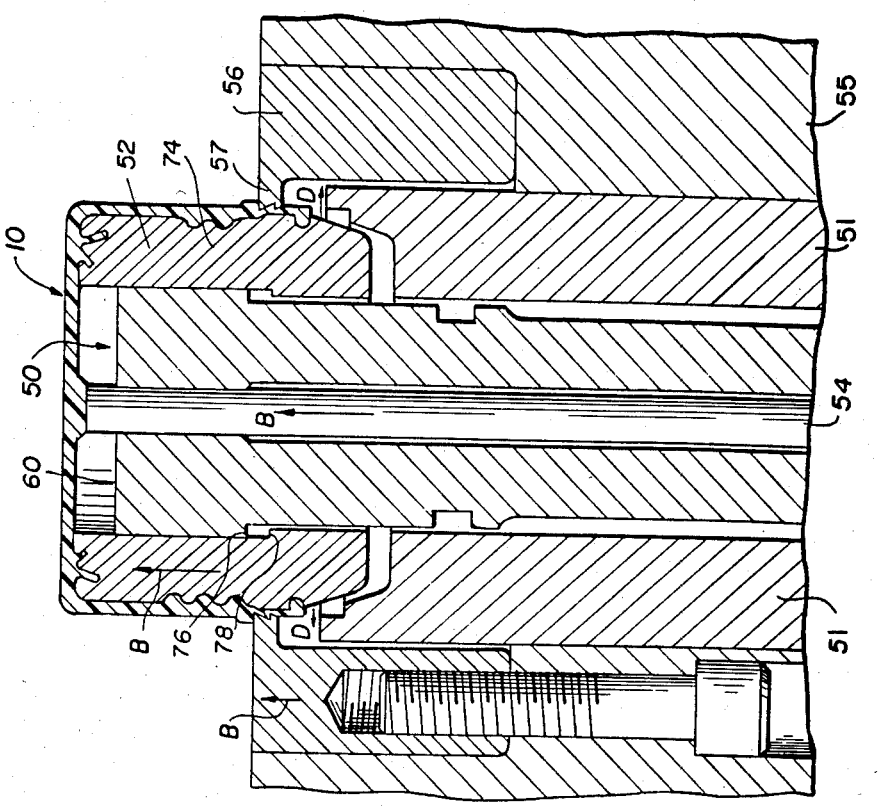
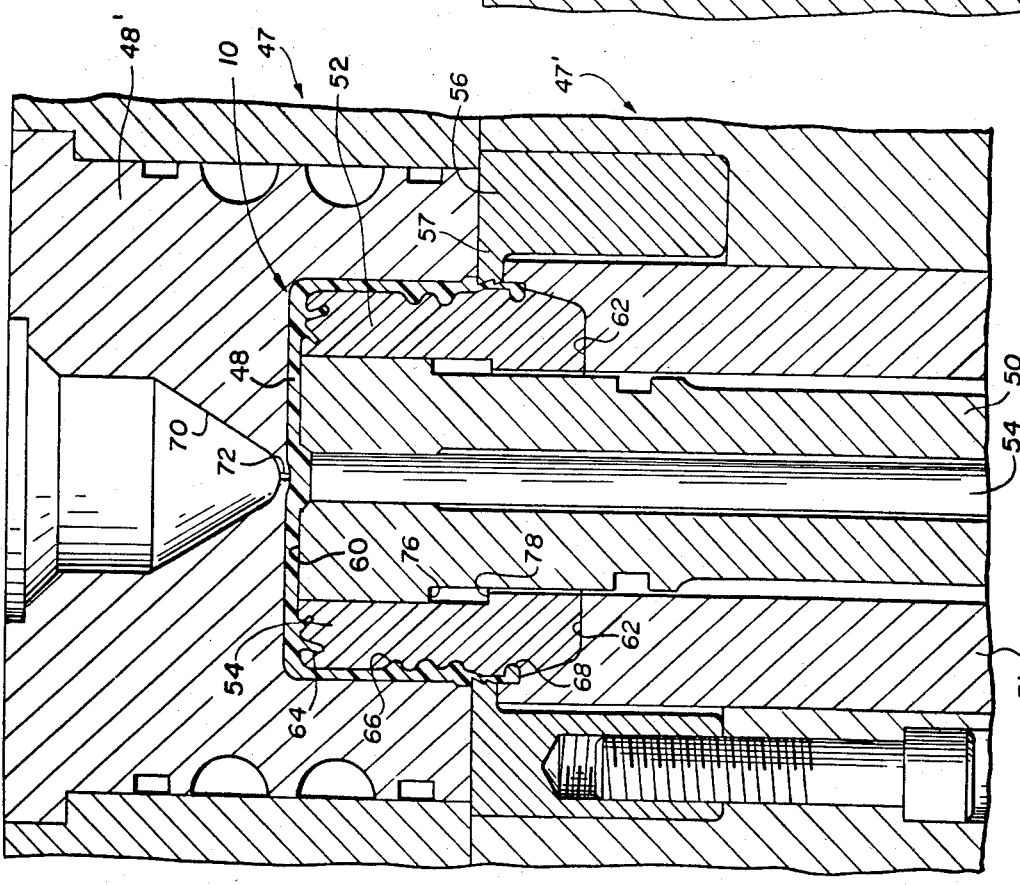

MOLD FOR MAKING TAMPER-PROOF CLOSURE

CROSS REFERENCE TO RELATED APPLICATIONS

This is a division of copending application Ser. No. 567,077, filed Jan. 5, 1984, now U.S. Pat. No. 4,526,282, issued July 2, 1985, and a continuation of co-pending application Ser. No. 491,673, filed May 5, 1983 now abandoned both being assigned to the assignee of the present application.

FIELD OF THE INVENTION

The present invention relates to tamper proof closure caps, which are sometimes referred to as tamper-evident type caps, and to a tool in the form of a mold for making such a cap. More particularly, the invention relates to the manufacture of a novel unitary cap which includes a skirt which is designed to serve a tamper proof function and to a molding tool which is designed to facilitate formation of the cap and attached tamper proof skirt and which includes a mechanism for removing the cap from the mold simply, quickly and effectively without damage to the tamper proof skirt.

PRIOR ART

Tamper proof closure caps for containers are known in the art, and are increasingly in demand for a wide variety of applications. Examples of such caps are found in the following U.S. Pat. Nos.: 2,162,711; 2,162,712; 3,441,161; 3,673,761; 3,720,343; 3,812,911; 3,929,246; 4,033,472, and 4,343,408.

A recurring problem in the production of tamper proof closure caps is the difficulty in making such a device sufficiently strong that it can be removed from a mold intact and remain intact during handling, shipment, and application to a container, yet sufficiently weakened where the tamper proof skirt portion is attached to the cap itself that the skirt will tear away from the cap whenever the cap is removed from its container. This difficulty has led to a wide variety of cap designs, has led to a variety of techniques for applying the caps to the container so as to compensate for design flaws dictated by manufacturing considerations, and has led to the design of complex mold configurations. These difficulties have adversely affected the cost of manufacturing such caps, particularly when they are made of plastic or other synthetic materials. Thus, the prior art discloses caps which must be cut and heated after the molding step. The cutting is necessary to produce a weakened area between the cap and a depending security ring, and the heating is necessary to deform the security ring onto the container being capped. Other patents disclose closure caps wherein the lower security ring is connected to the upper cap portion in such a way that the inside diameter of the security ring is equal to the outside diameter of the cap. This is done to facilitate the removal of the device from the mold, but serves to increase the size of the mold and further requires a deforming step after the cap is placed on a container to insure that the security ring engages the container. Other patents disclose a closure cap which is designed with an annular v-shaped groove which provides a weakened area for allowing the security ring to break away from the cap. However, the molding of such a cap requires a tool having complex cams and angle pins which increase the complexity and thus the cost of the mold. All of these factors adversely affect the cost of manufacturing and applying closure caps with tamper proof rings, or skirts.

Because manufacturing techniques impose restrictions on the shape of a cap, it would be desirable to provide a tamper proof closure cap design which is more cost effective from a manufacturing standpoint. This would involve a cap design which would be easy to apply to a container and would be effective to provide evidence of cap removal while at the same time would permit a tool design which would be relatively simple and inexpensive, yet would permit reliable manufacture of the cap. It would further be desirable to provide a closure cap designed for easy application to a container so as to avoid the heat shrinking methods which have been used in the prior art. Preferably, such a cap would merely be pressed onto the container or threaded on and the tamper proof skirt portion would "snap over" a corresponding bead on the container finish without damaging the cap. This has not been possible with prior cap designs, since the expansion of the skirt portion necessary to allow it to fit over a finish bead would either fracture the skirt or cause it to stretch and thus require heating to return it to its initial size. It would, therefore, be desirable to have a tamper proof closure cap having the capability of fitting over a finish bead to provide the desired security without the need for additional steps and without the danger of fracture.

OBJECTS AND SUMMARY OF THE INVENTION

It is an object of the present invention to provide an improved tool for fabricating a tamper proof closure cap.

A further object of the present invention is to provide a tamper proof closure cap which includes a deformable skirt portion which can be stretched to accommodate the container being closed without damage to the skirt portion and without requiring a subsequent heat-shrinking step and an improved tool for fabricating the closure cap.

A related object of the present invention is to provide an improved design for a tool to be used in the forming of articles such as closure caps having frangibly attached skirt portions.

The closure cap to be manufactured by the tool of the present invention includes a main body having a top and a depending annular side wall. A lower tamper proof element, or security ring, comprises a frangible skirt extending downwardly from the side wall of the closure cap. The frangible skirt is connected to the lower edge of the side wall at a weakened region which is formed at the interface with the side wall. The skirt also includes an inwardly projecting annular bead formed at its lower edge, and at least one external annular shoulder located above the bead. A first inwardly and upwardly tapered surface is provided on the outer surface of the skirt portion immediately below the external shoulder, and a second inwardly and upwardly curved surface is located above the external shoulder. Together with the shoulder, these exterior curved surfaces are used to facilitate removal of the closure cap from the forming mold after a molding operation is completed.

The mold of the present invention includes an upper cavity mold portion which defines the exterior surface of the cap, and a lower interior mold portion which fits within the cavity of the upper portion and defines the interior surface of the cap. The interior mold portion includes a support core which carries an annular movable core ring and a center pin, both being movable with respect to the support core. An annular stripper ring is movably mounted with respect to the support core and forms a part of the exterior mold surface in the area of the weakened region of the frangible skirt.

In operation, the top and bottom halves of the mold are closed and the cap material injected into the cavity defined therebetween, in conventional manner. After curing, the mold is opened by separating the upper cavity mold portion from the lower portion, leaving the formed cap on the lower portion of the mold and engaged on its outer surface by the stripper ring. The interior movable ring and the center pin are moved upwardly with respect to the support core, as is the stripper ring to separate the cap from the support core. When the movable core ring reaches its upper limit of motion, the center pin and the stripper ring continue to move upwardly in the same direction and serve to strip the cap from the core ring. The exterior stripper ring engages corresponding shoulders formed on the exterior surface of the cap in the weakened region between the skirt and the cap side wall so that the stripper ring can exert sufficient force to remove the cap from the mold ring. A certain amount of flexing of the lower peripheral bead formed on the skirt portion is required to enable the bead to move over the surface of the core ring. However, this flexing is facilitated by the provision of a plurality of generally vertical grooves formed in the annular bead which allow the skirt to expand radially. The construction of the exterior stripper ring permits such expansion and, at the same time, prevents flexing of the weakened region, whereby the cap can be removed from the mold reliably and without damage.

BRIEF DESCRIPTION OF THE DRAWINGS

The foregoing and additional objects, features and advantages of the present invention will be more fully understood from a consideration of the following detailed description of a preferred embodiment of the invention, taken in conjunction with the accompanying drawings, in which:

FIGS. 2–6 schematically illustrate in cross-section the tool and the closure cap, as well as the sequence of steps for ejecting the closure cap from the tool.

DESCRIPTION OF A PREFERRED EMBODIMENT

Figure 1:
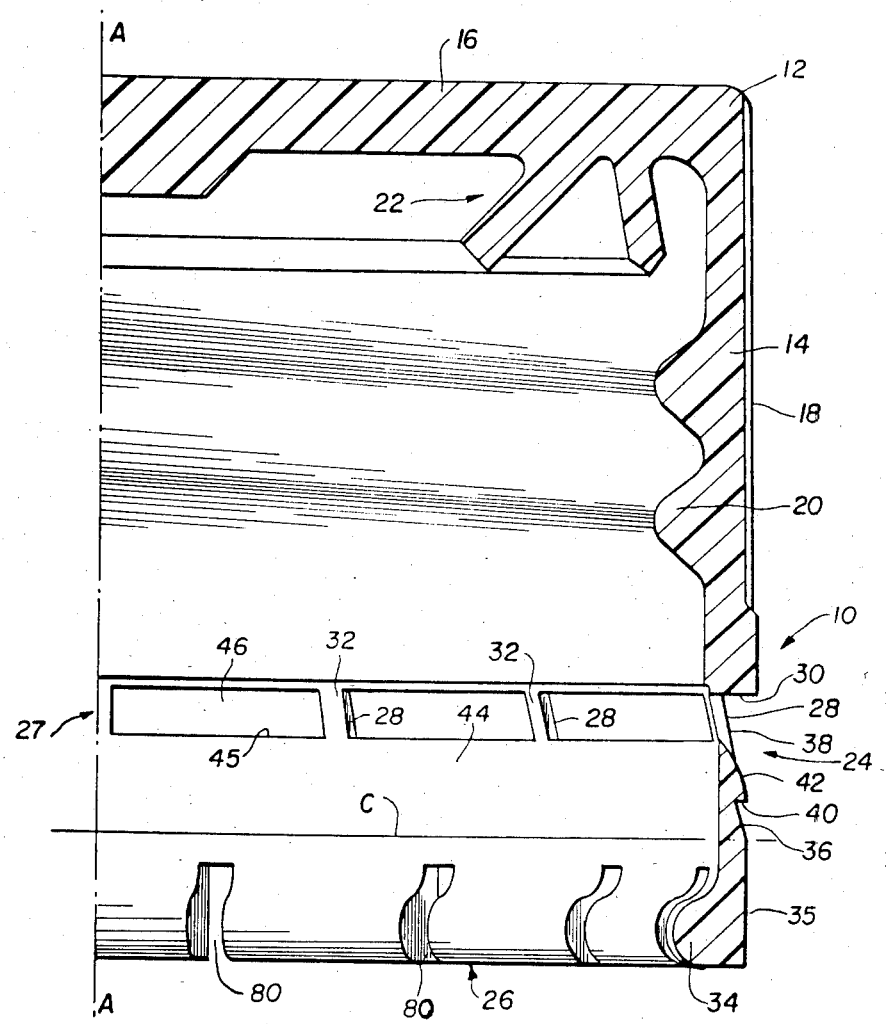
FIG. 1 is a partial view in cross-section of a closure cap which incorporates a tamper proof feature and which is to be molded in accordance with the present invention.

Turning now to a more detailed consideration of the present invention, there is illustrated in FIG. 1 a closure cap 10 having a longitudinal axis A—A. The cap includes an outer closure shell 12 comprising an annular side wall 14 and a transverse top 16. The annular side wall 14 may include serrations 18 on its exterior surface and a conventional thread 20 on its interior surface. An annular sealing member 22 is formed as part of the closure member and preferably is similar to that shown in U.S. Pat. No. 4,143,785. Alternatively, the sealing member 22 can be constructed in accordance with the two-shot design shown in U.S. Pat. No. 4,308,965. Connected to and formed as a continuation of the side wall 14 is a tamper proof skirt 24 which is formed unitarily with the cap, but which is separable therefrom. The tamper proof skirt 24 comprises an annular security ring portion 26 having a weakened region generally indicated at 27, the weakened region being provided by, and thus defined by a series of spaced connection ribs 28, each of which extends between the ring portion 26 and the annular wall 14. The ribs 28 each taper upwardly and inwardly toward the inner peripheral edge of a lower surface 30 forming the bottom of sidewall 14. The surface 30 is generally perpendicular to the axis A—A of the cap and defines a first transverse shoulder for the cap. Each rib is tapered to define a narrowed region 32 at its connection, or interface, with the surface 30, which region of each of the ribs is designed to fracture when the cap is removed from a container on which it has been placed, thereby leaving the ring 26 on the container as evidence of tampering.

The ring portion 26 includes a bead 34 formed on its lower edge and extending inwardly. This bead is adapted to engage the lower edge of a corresponding bead formed on the exterior finish of the container to which the cap is to be applied. The bead 34 inhibits removal of the ring portion 26 from the container, thereby causing the fracturing of the ribs 28.

The outer surface of the ring portion 26 is shaped to facilitate removal of the ring from the shaping tool, or mold, which is used in the manufacture of the cap. Accordingly, the ring is defined by a lower surface 35 which is essentially concentric with the axis A—A and which extends from the bottom of skirt 26 to a location above the bead 34 which is identified by the plane C illustrated in FIG. 1. From this location, the exterior surface indicated at 36 tapers inwardly and upwardly, preferably at an angle of approximately 10° from the vertical. It should be noted that the exterior surfaces of the ribs 28, which were previously said to be tapered inwardly, also are tapered at approximately 10° from the vertical as indicated at 38.

The inwardly sloping surface 36 terminates at a transversely extending annular shoulder 40 which lies about midway between the plane C and the top edge of the skirt portion 26. Extending upwardly from the outer periphery of the shoulder 40 is a surface portion 42 which is arcuate and which extends upwardly and inwardly to intersect the inner vertical surface 44 of the ring portion 26. Surfaces 42 and 44 intersect to define the top edge 45 of the security ring portion 26 at which location the ribs 28 join the ring 26. The top edge 45, the spaced ribs 28, and the bottom surface 30 define a plurality of apertures 46 which extend around the circumference of the cap and which define the weakened region 27 between the cap shell 12 and the security ring 26. Preferably, the arcuate surface 42 has a radius of about 0.125" for a typical cap structure, but this may vary with different sizes of caps.

The significance of the shapes of the exterior surfaces of the tamper-proof skirt 24 and the sidewall 14 will become more apparent from the following discussion of the molding tool used to form the cap.

A tool or mold for making the cap 10 is illustrated in FIGS. 2–6 as including top and bottom halves 47 and, respectively, which cooperate to define a mold cavity 48 in which the cap is formed. The top half of the mold 47 includes an upper cavity mold portion 48' which defines at 49 the exterior surface configuration of a cap. The interior of the cavity 48 is defined by the lower half 47' of the mold which includes inner and outer lower support core elements 50 and 51, which may be parts of a single core piece, an annular movable core ring 52 coaxial with and mounted for limited axial motion with respect to support core elements 50 and 51 and an axial center pin 54 movable within support core element 50. An exterior mold housing 55 carries an annular stripper ring 56, which is coaxial with and outside core element 51, and is mounted for axial motion with respect to the support core elements 50 and 51. The interior surface of the stripper ring 56 includes an inwardly extending projection 57 having a mold face 58 (FIG. 7) which cooperates with the top half 47 of the mold to define a portion of the exterior surface of the cap 10 when the mold is closed (see FIG. 2). More particularly, the mold projection 57 of the stripper ring 56 defines the shape of the transverse shoulder portions 30 and 40 as well as the tapered surfaces 36 and 42, the ribs 28, and the apertures 46 of the weakened region 27 of skirt 24 during the molding operation. Thus, the molding projection 57 of the stripper ring 56 shapes and defines the weakened region 27 of the skirt 24.

The core element 50 includes an upper surface 60 which defines and forms the inner surface of the top of cap 10, while core element 51 includes a lower annular support shoulder 62 which shapes the outer surface of the cavity 48 in the region of the tamper-proof ring 26. The core element 51 also receives the bottom edge of the core ring 52 to position that ring during the molding operation so that its top is flush with the top of core element 50. The top of the core ring 52 is shaped to define a part of the interior surface of the top of cap 10, including the sealing portion 22. The core ring 52 also defines on its outer peripheral surface the shape of the interior surface of wall 14 of the cap as well as the interior surface of the depending skirt 24. Thus, the core ring 52 may include suitable grooves 64 for forming the sealing ring 22, grooves 66 for forming the thread 20, and a groove 68 for forming the bead 34.

Figure 3:
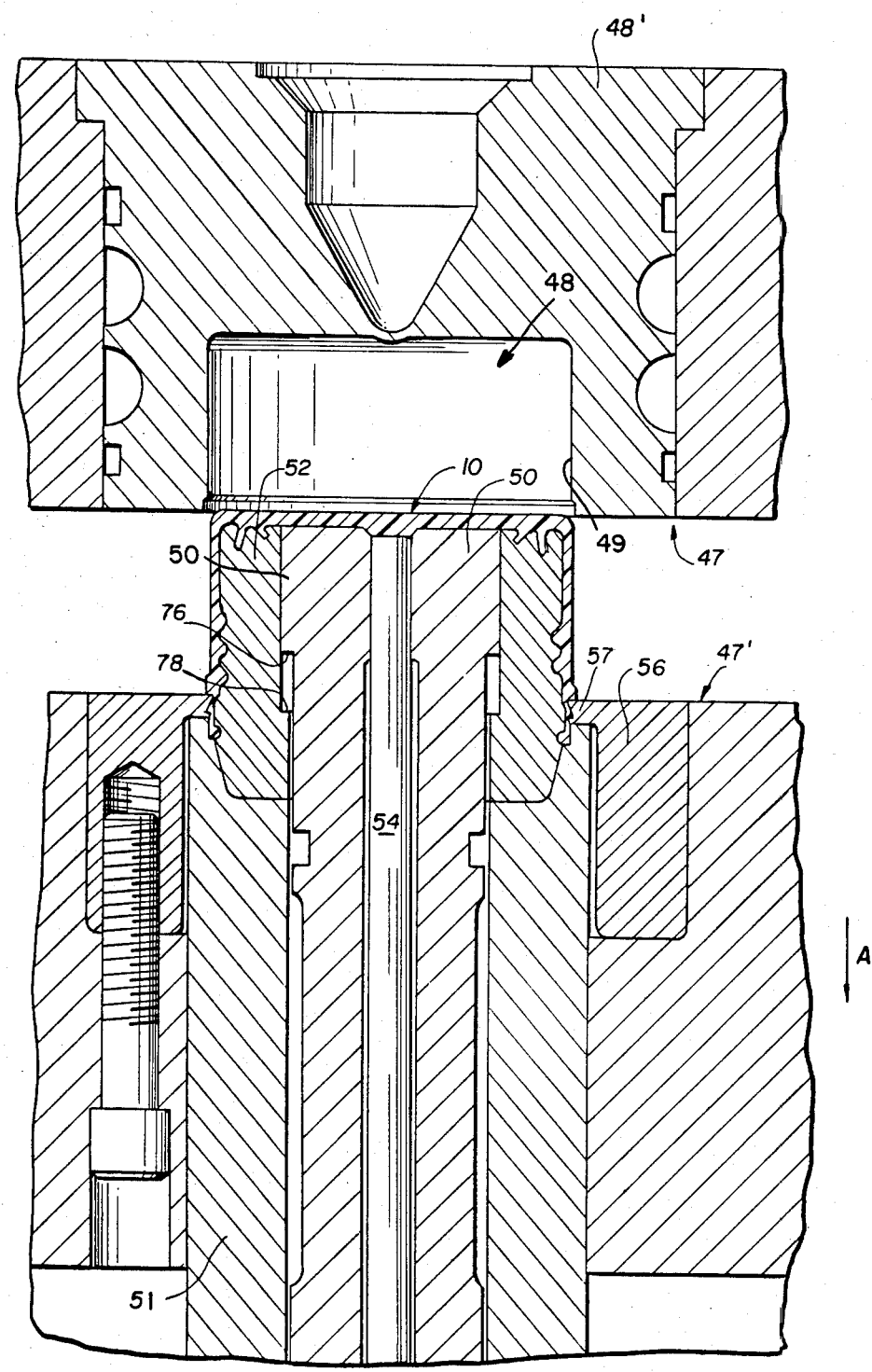

The unique cooperation between the stripper ring 56 and the remainder of the mold for releasing the cap 10 without damaging the tamper proof skirt 24 is illustrated in FIGS. 2-6. FIG. 2 shows the mold portions 47 and 47' in the closed position, subsequent to the formation of the closure cap 10 by conventional injection of a suitable plastic material from an injection device (not shown) through an injection cavity 70 formed in the upper portion 47 of the mold, and through a port 72 into cavity 48. After the cap is formed, the mold is opened by separating the upper and lower portions 47 and 47', as by moving the elements 50, 51, 52, 54, 55 and 56, together with cap 10, downwardly in the direction of arrow A (FIG. 3) and away from the upper mold portion 47. This withdraws the closure cap 10 from the cavity surface 49 defined in portion 48' of mold 47, the cap being held securely on the downwardly moving elements, as shown in FIG. 3. The downward movement continues until a sufficient clearance is achieved relative to the upper cavity mold 48' to permit removal of the closure cap 10 from the lower mold elements in the manner to be described.

Once a sufficient clearance is achieved, the cap is stripped from the lower mold portion 47' by moving the stripper ring 56 and the center pin 54 upwardly with respect to the support core elements 50 and 51 in the direction indicated by the arrows B in FIG. 4. This motion carries the cap and the annular core ring 52 upwardly on the support core 50. As illustrated in FIG. 4, the support core element 50 incorporates a central support post which surrounds and guides the center pin 54 and further includes an enlarged head portion 74 which defines a lower transversely extending shoulder 76. The movable core ring 52 slideably engages the enlarged portion 74 and includes at its lower end an inwardly extending shoulder portion 78 which extends inwardly below the enlarged portion of the support core 50 so that the opposed shoulders 76 and 78 act as a motion-limiting stop for the core ring 52. Thus, the upward motion of the stripper ring 56 and the center pin 54 carries the core ring 52 upwardly until the shoulder 78 engages the opposed shoulder 76 to stop the upward motion of the core ring. At this time, the security ring portion 26 of the skirt 24 has moved upwardly with respect to the core element 50 sufficiently far to be free of the core (see FIG. 4).

Figure 5:
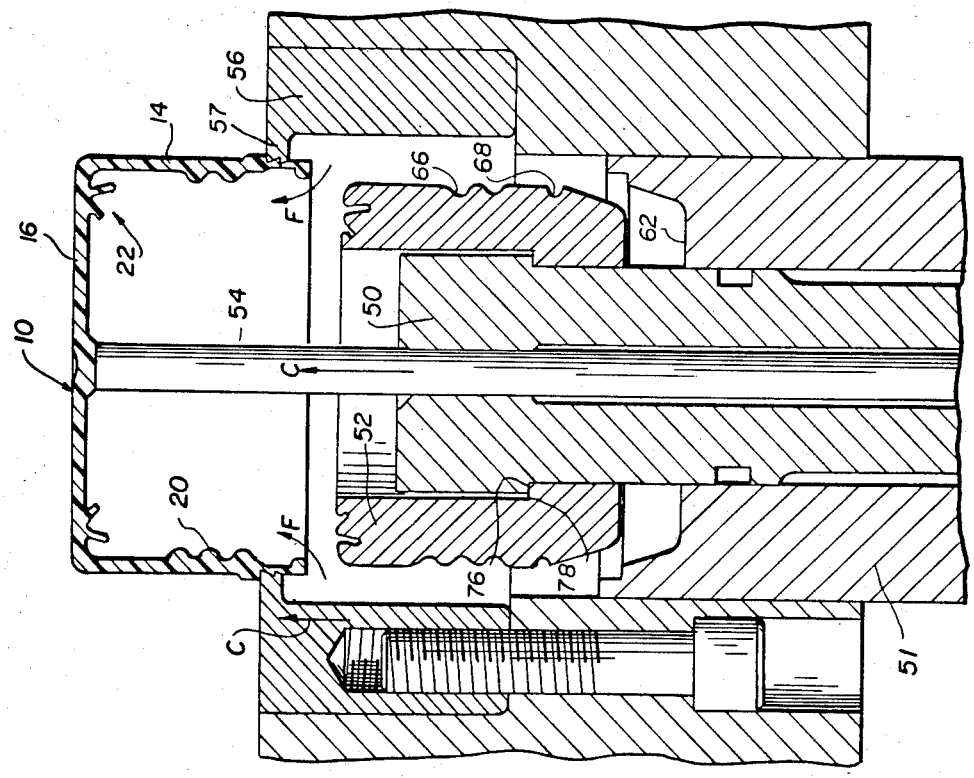

After the core ring 52 stops, the center pin 54 and the stripper ring 56 continue to move upwardly with respect to the center core 50 and with respect to the now-stopped core ring 52 (see FIG. 5). This continued motion of the stripper ring and the center pin removes the finished cap 10 from the movable core ring (see FIG. 6). The engagement of the stripper ring with the shoulders 30 and 40 formed on the exterior of the cap enables the stripper ring 56 to force the cap upwardly to disengage the threads 20 from the corresponding grooves 66 and to disengage the bead 34 from its corresponding groove 68 in the core ring 52. Ordinarily, such a removal operation would be expected to cause serious damage to the security ring, for the narrow ribs 28 in the weakened region 27 between the cap side wall 14 and the security ring 26 will often fracture during such a removal operation, resulting in an unacceptable level of rejects. However, the stripper ring 56 of the present invention engages not only the bottom of the wall 14 by means of shoulder 30, but also engages the security ring 26 by means of shoulder 40, so that the upward motion of the stripper ring not only forces the shell 12 up and off of the core ring 52, but also applies and upward force to the security ring portion 26, thereby preventing longitudinal stress in the ribs 28. Furthermore, the engagement of the stripper ring 56 with the exterior surfaces of the skirt 24 above the region of the bead 34 permits the bead to flex outwardly (in a direction indicated by the arrow D in FIG. 4) sufficiently to the clear core ring 52 while at the same time preventing the weakened portion 27 of the skirt 24 above the surface area 36 from flexing outwardly and being stressed. The molding projection 57 of the stripper ring 56 engages the surfaces 36 and 42 as well as the shoulder 40, the ribs 28, and the shoulder 30, to prevent these areas, which are reduced in thickness and therefore comprise the weakened region of the skirt, from flexing outwardly during the cap stripping. Thus, the pivot point for the lower bead portion of the security ring is effectively shifted down from the area of the ribs 28 to the area of the plane C (FIG. 1).

Movement of the bead 34 out of its corresponding groove 68 during the stripping operation may be facilitated by the provision of a plurality of vertically extending slots 80. These slots allow the bead to expand in a radial direction and thus to more easily pass over the core ring 52. These slots serve, in addition, to facilitate the application of the closure cap 10 to a container, enabling the security ring 26 to expand radially during application of the container as the bead 34 passes over a corresponding bead on the container finish.

Figure 6:
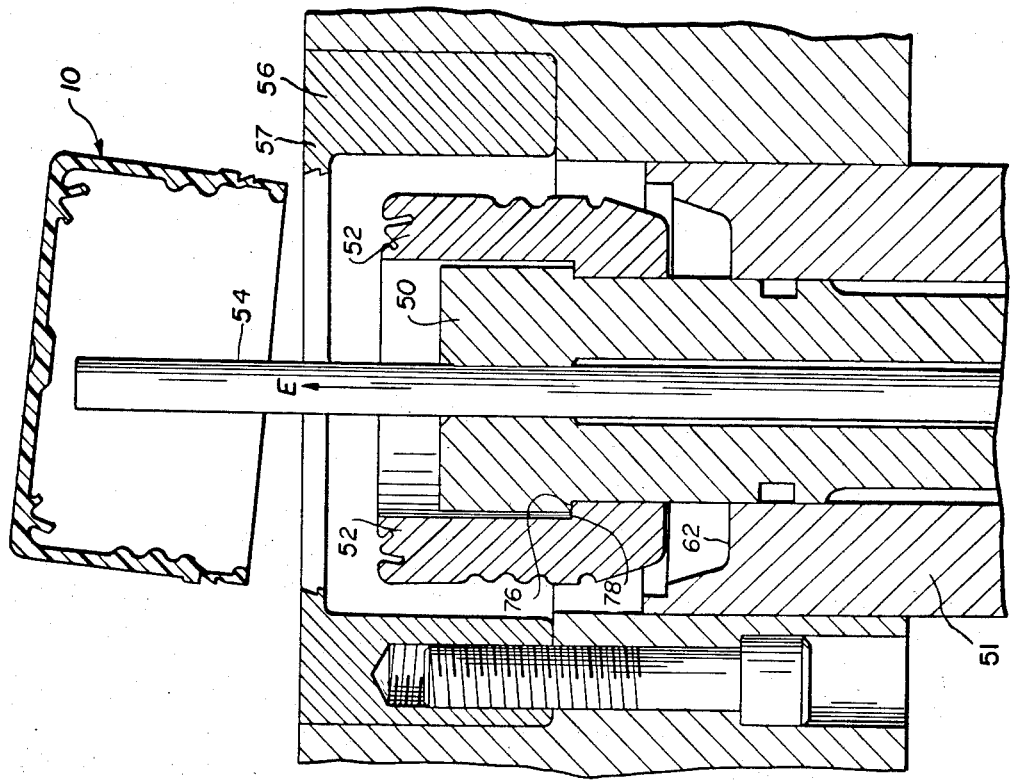

Once the cap 10 has been moved upwardly by the stripper ring 56 and by the center pin 54 in the manner described above, the stripper ring 56 is stopped and the cap 10 is separated therefrom by further upward movement of the center pin 56 in the direction indicated by the arrow E in FIG. 6. Only a slight flexing of the skirt 24 inwardly, in the direction of the arrows F in FIG. 5, is needed for this purpose, and this movement is facilitated by the taper of the surfaces 36 and 38 and the curvature of the surface 42.

Figure 7:
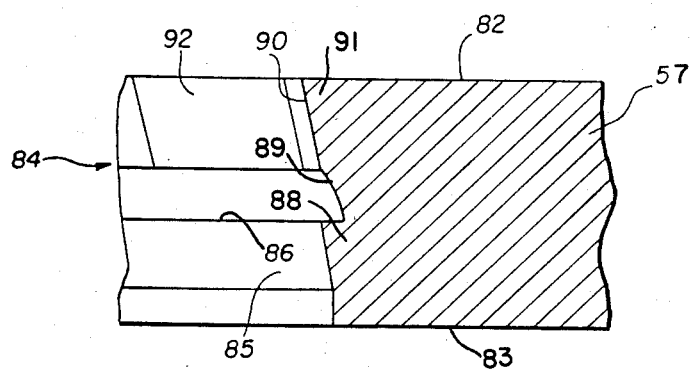
FIG. 7 is a partial enlarged cross-sectional view of the stripper ring illustrated in FIGS. 2–6.

The unique stripper ring 56 not only provides a mold surface for shaping the corresponding mating surfaces on the cap 10 but also cooperates with those surfaces in the removal of the cap from the mold to consistently produce a cap with its tamper proof skirt portion intact, thereby effectively eliminating the loss of cap production due to damage caused during removal from the forming mold. As illustrated in FIG. 7, the projection 57 of stripper ring 56 includes substantially transversely outwardly extending top and bottom surfaces 82 and 83, respectively, and a generally axially extending interior mold surface 84 therebetween. The interior surface 84 includes a lower portion 85 which is tapered upwardly and inwardly to a transversely extending portion 86, surface portions 85 and 86 intersecting to define a lower shoulder 88. The interior surface 84 further includes an arcuate, upwardly and inwardly arcuate surface portion 89, the lower edge of which also intersects surface portion 86 to define the outer edge of shoulder 88. The arcuate portion 89 terminates at its upper edge at an inwardly and upwardly tapered surface portion 90 which intersects the top surface 82 to define an upper shoulder 91. The interior surface 84 is shaped to form, and thus to engage, the surfaces 36, 40, 42, and 38 of the skirt 24 by means of mating surfaces 85, 86, 89, and 90, respectively, and to form, and thus engage, the shoulder surface 30 of the cap shell 12 by means of mating surfaces 82. The shoulders 30 and 40 of the cap are thus engaged by the corresponding shoulders 91 and 88 of the stripper ring 56 for removal of the cap from the mold. The interior surface 84 also incorporates a plurality of spaced blocks 92 which extend inwardly from surface 90 to engage the exterior surface of the movable core ring 52 when the mold is in its closed position so as to form the apertures 46 between the ribs 28, illustrated in FIG. 1.

Thus there has been described a new and unique closure cap for containers as well as a novel mold arrangement and method for stripping the cap therefrom. Although the invention has been described in terms of a preferred embodiment, it will be apparent that various modifications may be made without departing from the true spirit and scope thereof as set forth in the following claims.

What is claimed is:

1. A mold for forming a closure cap having a closure shell and an integrally formed tamper-proof security ring secured thereto by frangible ribs, comprising:
   upper and lower mold portions cooperating to define, in a closed position, a closure cap cavity;
   a movable core ring mounted on said lower mold portion and adapted to engage the inner surface of a closure cap formed in said cavity;
   an annular stripper ring including inwardly extending projection having a generally axially extending interior mold face adapted to cooperate with said moveable core ring to define a part of said closure cap cavity and adapted to engage the outer surface of a closure cap formed in said cavity, said stripper ring including a first transverse surface which intersects a generally axially extending first portion of said interior mold face to define a first stripper ring shoulder adapted to engage a corresponding shoulder defined on the skirt portion of a closure cap formed in said closure cap cavity.

2. The mold as defined in claim 1, wherein said inwardly extending porjection of said stripper ring further includes a second transverse surface portion which intersects a generally axially extending second portion of said interior mold face to define a second stripper ring shoulder adapted to engage a corresponding shoulder defined on the shell portion of a closure cap formed in said closure cap cavity, said stripper ring being operable to remove the closure shell portion and the tamperproof security ring portion of a closure cap simultaneously from said moveable core ring.

3. The mold as defined in claim 2, wherein said generally axially extending mold face includes an arcuate surface portion intersecting said first transverse surface portion to define said first shoulder.

4. The mold as defined in claim 3, wherein said second portion of said generally axially extending interior mold face is tapered upwardly and inwardly.

5. A mold for forming a unitary article having upper and lower interconnected portions, comprising:
   upper and lower mold portions cooperating to define, in a closed position, an article molding cavity;
   a moveable core ring mounted on said lower mold portion to engage the inner surface of an article formed in said cavity;
   an annular stripper ring having an inwardly extending projection with a generally axially extending mold face cooperating with said moveable core to define said cavity and engaging the outer surface of an article formed in said cavity, said stripper ring including:
   a first transverse surface formed in said mold face to define a first stripper ring shoulder to engage a corresponding first shoulder formed in said lower article portion; and
   a second transverse surface formed in said mold face to define a second stripper ring shoulder to engage a corresponding second shoulder formed in said upper article portion, said first and second stripper ring shoulders being operable to remove the upper and lower portions of a molded article from said core ring simultaneously without separating the upper and lower interconnected portions thereof.

* * * * *